United States Patent
Castelnovi et al.

(10) Patent No.: US 12,003,614 B2
(45) Date of Patent: Jun. 4, 2024

(54) INFECTIVE COUNTERMEASURES

(71) Applicant: Idemia France, Courbevoie (FR)

(72) Inventors: Laurent Castelnovi, Courbevoie (FR); Guillaume Barbu, Courbevoie (FR); Luk Bettale, Courbevoie (FR); Thomas Chabrier, Courbevoie (FR); Nicolas Debande, Courbevoie (FR); Christophe Giraud, Courbevoie (FR); Nathan Reboud, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 183 days.

(21) Appl. No.: 17/804,236

(22) Filed: May 26, 2022

(65) Prior Publication Data

US 2022/0393852 A1     Dec. 8, 2022

(30) Foreign Application Priority Data

May 26, 2021   (FR) ........................... 2105447

(51) Int. Cl.
*G06F 21/72*   (2013.01)
*H04L 9/00*    (2022.01)

(52) U.S. Cl.
CPC .............. *H04L 9/004* (2013.01); *G06F 21/72* (2013.01); *H04L 2209/12* (2013.01)

(58) Field of Classification Search
CPC ...... H04L 9/004; H04L 2209/12; G06F 21/72
USPC ........................................................... 380/28
See application file for complete search history.

(56) References Cited

U.S. PATENT DOCUMENTS

| | | | | |
|---|---|---|---|---|
| 6,199,162 | B1* | 3/2001 | Luyster | H04L 9/002 |
| | | | | 713/168 |
| 10,305,479 | B1* | 5/2019 | Doll | H04L 9/004 |
| 2011/0103584 | A1* | 5/2011 | Liardet | H04L 9/004 |
| | | | | 380/255 |
| 2011/0170691 | A1* | 7/2011 | Liardet | H04L 9/004 |
| | | | | 380/259 |
| 2017/0359165 | A1* | 12/2017 | Liu | G09C 1/00 |

(Continued)

OTHER PUBLICATIONS

FR Search Report and Written Opinion issued in FR Patent Application No. 2105447 dated Feb. 2, 2022.

(Continued)

*Primary Examiner* — Thanh T Le

(74) *Attorney, Agent, or Firm* — NIXON & VANDERHYE

(57) ABSTRACT

The invention proposes a novel type of infective countermeasure against fault injection attacks. Instead of determining the injected error before amplifying it, the novel countermeasure applies the same diffusion function to two intermediate ciphers obtained by executing a cryptographic operation on an input. The error is therefore amplified within the same intermediate ciphers, referred to as infective ciphers after diffusion. It is then possible to use diffusion functions which do not map the cipher 0 as an output equal to 0. A cipher recomposed from bits of undiffused ciphers is also generated. These infective and recomposed ciphers are XOR-combined to provide an output cipher. This approach makes it possible to adapt, by simple duplication of the pairs and associated specific diffusion functions, the protection offered by the countermeasure to a desired number of injected faults.

16 Claims, 5 Drawing Sheets

(56) References Cited

U.S. PATENT DOCUMENTS

2019/0278945 A1* 9/2019 Sugahara .............. G06F 21/755
2023/0027329 A1* 1/2023 Durham ................ H04L 9/0631

OTHER PUBLICATIONS

Agoyan et al., "Design and characterisation of an AES chip embedding countermeasures," International Journal of Intelligent Engineering Informatics, Jan. 1, 2011, 22 pages, XP055319803.

Baksi et al., "To infect or not to infect: a critical analysis of infective countermeasures in fault attacks," Journal of Cryptographic Engineering, May 23, 2020, vol. 10, No. 4, pp. 355-374, XP037282720.

Lomne et al., "On the Need of Randomness in Fault Attack Countermeasures—Application to AES," IEEE, 2012 Workshop on Fault Diagnosis and Tolerance in Cryptography (FDTC), Sep. 9, 2012, pp. 85-94, XP032240372.

Baksi et al., "A Novel Duplication Based Countermeasure to Statistical Ineffective Fault Analysis," International Association for Cryptologic Research (IACR), vol. 20201014:181639, Oct. 12, 2020, pp. 1-14, XP061041527, Retrieved from the Internet: URL:http://eprint.iacr.org/2020/1268.pdf.

\* cited by examiner

INFECTIVE COUNTERMEASURES

CROSS-REFERENCE TO RELATED APPLICATIONS

This application claims priority pursuant to 35 U.S.C. 119(a) to France Patent Application No. 2105447, filed May 26, 2021, which application is incorporated herein by reference in its entirety.

TECHNICAL FIELD

The present invention relates to the field of computer security. It relates, more particularly, to the securing of cryptographic methods, processing or operations.

PRIOR ART

Certain data-processing methods, particularly with in the context of the cryptographic processing (for example, encryption or decryption) of data, use cryptographic algorithms based on one or more cryptographic secrets or keys. Examples of cryptographic operations include the digital signature of a message or its encryption, as output data (binary data) referred to as "ciphertext", "encrypted message" or simply "cipher". Other examples include the decryption of a cipher, as output data referred to as a "cleartext" message. The main classes of cryptographic operations include symmetrical encryption/decryption or secret key algorithms (for example AES, DES), asymmetrical encryption/decryption or public and private key algorithms (for example RSA, DSA), and hash functions (for example MD5 and SHA-3).

The cryptographic secrets or keys must not be accessible. In addition, cryptographic processing is generally used in secure cryptographic systems equipped with cryptoprocessors, systems such as secure elements (SE), i.e. secure hardware platforms capable of holding data in accordance with the rules and security requirements set by trusted authorities. Secure elements may be embedded (embedded SE or eSE) or removable, and notably include smart cards, UICC cards (or eUICC).

These methods are the target of attacks by malicious users who seek to evade the system's security.

These attacks include fault generation type attacks which involve deliberately disrupting the normal execution of the data-processing method in order to obtain, at the output of the method, data (messages) different from that normally expected but which reveal information about the secret data used in the cryptographic algorithm. These attacks may involve hardware components (cryptoprocessor) or software of the system.

Countermeasures have thus been proposed to combat this type of attack.

Detective countermeasures are known, which are principally based on redundant execution of the cryptographic algorithm and comparison of the results of the principle execution and of the redundant execution. In the event of an erroneous comparison, the method is interrupted and a security action is instigated. However, these countermeasures are vulnerable to attacks on the comparison step itself.

To dispense with this comparison, other infective countermeasures have been proposed. They diffuse the effect of the fault to render the encrypted or decrypted message unexploitable by the malicious user.

FIG. 1 schematically shows the principle of known infective countermeasures. The cryptographic operation OPE on the input message E is duplicated making it possible to obtain two identical messages, so-called "first messages", $c_0$, $c_1$, in the absence of a fault attack. The messages may be encrypted or cleartext messages depending on the operation implemented. For clarity, reference is principally made below to "ciphers".

An XOR (eXclusive-OR) 10 on the ciphers $c_0$, $c_1$ originating from two executions of the cryptographic operation calculates the injected error 'e' (zero in the absence of a fault), which is diffused, i.e. modified and amplified, by a diffusion function $f_{\mathit{diff}}$ which maps 0 (no error) as 0 and any other binary input value (injected error not zero) as a different output value (this is the diffusion of the error).

A diffusion function is deterministic, always producing the same output for the same input, for fixed parameters of the function. It additionally has high entropy, i.e. substantially modifying the output for a minor modification of the input.

The diffused error $e_{\mathit{diff}}$ (zero or otherwise) is then added (XOR 11) to one of the ciphers ($c_0$) to provide an infected cipher at the output S.

Also, the infective countermeasures infect the cipher result such that if the cryptographic calculation was carried out correctly (without an injected error) then the cipher result will be correct, otherwise the cipher result will a priori not be able to be used by the attacker.

This infective countermeasure set-up is not satisfactory, at the very least for the following reasons.

On the one hand, it is not resistant to multiple fault injection attacks. It would therefore be useful to have infective countermeasures which are resistant to multiple fault injection attacks. It would also be preferable to have such countermeasures which can be easily adapted to the desired protection level.

On the other hand, the restriction on the diffusion function (0 mapped as 0) significantly reduces the usable diffusion functions, as these have, for the most part, already been quashed in the literature.

There is therefore a general need to improve the known infective countermeasures.

OVERVIEW OF THE INVENTION

In this drawing, the invention notably provides for a method for cryptographic processing of an input message into an output message, comprising the following steps implemented by a processor:

- executing several times a single cryptographic operation on the input message in order to obtain one or more pairs of intermediate messages,
- for each pair, applying a single diffusion function to the two intermediate messages of the pair in order to obtain two infective messages, and
- combining the infective messages with a recomposed message obtained by selecting bits from one or more first messages resulting from the executions of the cryptographic operation, in order to obtain the output message.

Depending on the nature of the cryptographic operation, the first messages resulting from its execution, as well as the intermediate messages, the infective messages and the recomposed message may all be encrypted or all correspond to cleartext messages.

Correspondingly, the invention also relates to a cryptographic processing device comprising a processor configured to:

- execute several times a single cryptographic operation on an input message in order to obtain one or more pairs of intermediate messages,
- for each pair, apply a single diffusion function to the two intermediate messages of the pair in order to obtain two infective messages, and
- combine the infective messages with a recomposed message obtained by selecting bits from one or more first messages resulting from the executions of the cryptographic operation, in order to obtain an output message.

It is thus possible to execute two or three times the cryptographic operation and combine two infective messages (e.g. ciphers) (i.e. of a single pair) with the recomposed message, or four or five times the cryptographic operation and combine four infective messages (i.e. two pairs associated with two diffusion functions) with the recomposed message, or more generally 2d or 2d+1 times the cryptographic operation (d integer greater than or equal to 1) and combine 2d infective messages (d pairs associated with d diffusion functions) with the recomposed message.

The application of the same diffusion function to a pair of intermediate messages and the subsequent combination thereof, for example via an XOR, make it possible to cancel the effects of the diffusion function in the absence of a fault. Also, the restriction aiming to map a message (e.g. cipher) 0 as an "infective" message 0 is lifted. The result is a greater number of diffusion functions available.

It is noted that each pair of intermediate messages provides protection against a fault attack. The invention can therefore be scaled for the number of fault attacks to which it must be resistant, simply by multiplying the number of pairs of intermediate messages processed (with an associated diffusion function).

Optional features of embodiments of the invention are defined in the appended claims. Some of these features are explained below referring to a method, while they may be transposed into device features.

In one embodiment, the diffusion function is different from one pair of intermediate messages to the other. Different k diffusion functions are therefore used for k pairs of infective messages.

In one embodiment, the diffusion function of one pair is based on a first parameter specific to said pair, for example a unique identifier of said pair. This identifier can notably be concatenated with the intermediate message at the input of the diffusion function. It is thus possible to use a single diffusion algorithm for all the pairs, whereupon only this identifier would vary between the pairs. This provision simplifies the computational complexity.

In another embodiment, the diffusion function(s) of the pairs are based on a second parameter which varies in order to obtain a new output message from a new input message. Thus, the diffusion function of a pair changes from one execution of the countermeasure to another, improving the robustness of the countermeasure against fault injection attacks over several executions.

In one embodiment, the diffusion function is a pseudorandom number generator (PRNG) based on one or more keys, for example said first and/or second parameters. Naturally, other types of diffusion function may be used, for example hash functions.

In first embodiments, each intermediate message is a first message resulting directly from one of the executions of the cryptographic operation. This provision offers a simple implementation of the countermeasure against one or more fault injections.

In second embodiments, each intermediate message is a message which concatenates, according to a corresponding concatenation profile, several or all of the first messages resulting directly from the executions of the cryptographic operation.

This provision makes it possible to reduce the number of executions of the cryptographic operation against a fixed number of fault injections, compared to the first embodiments hereinbefore.

In a specific embodiment, intermediate messages of two different pairs differ from one another by a different rotation of the first messages within a single master message concatenating all the first messages.

In an alternative embodiment, the intermediate messages are formed of distinct pairs of first messages. For example, the first intermediate message is formed of the first two messages resulting from the first two executions of the cryptographic operation; the second intermediate message of the first two messages resulting from the second and third executions of the cryptographic operation; and so on, the last intermediate message being formed of the first two messages resulting from the last and first executions of the cryptographic operation. This embodiment makes it possible to dispense with a different diffusion function for each pair.

Generally, it is possible to dispense with a different diffusion function for each pair if at most $$\left\lfloor \frac{n}{2} \right\rfloor$$

disjoint pairs of concatenation profiles are symmetrical for a group of n first messages, $\lfloor x \rfloor$ being the floor of x. A pair of concatenation profiles is said to be symmetrical for the group of n first messages when its two concatenation profiles use the same message positions in the concatenation to position the first messages originating from the group of n first messages. This restriction may be checked for any n between 2 and d, with d+1 the total number of executions of the cryptographic operation.

This configuration in fact makes it possible to prevent $$\left\lfloor \frac{n}{2} \right\rfloor + 1 \text{ pairs}$$

from having identical intermediate messages and that they thus cancel each other out during the final combination. The robustness against n injected faults is thus guaranteed.

In a particular embodiment, the recomposed message is not only formed by one or more of said first n messages of the group when $$\left\lfloor \frac{n}{2} \right\rfloor$$

disjoint pairs of concatenation profiles are symmetrical. In other words, the presence, in the recomposed message, of at least one first message which is not involved in the symmetry of the $$\left\lfloor \frac{n}{2} \right\rfloor$$

pairs of concatenation profiles is needed. This improves the robustness of the countermeasure against n fault injection attacks. Preferably, this provision is satisfied for n pair. Preferentially, it is additionally satisfied for d pair.

In one embodiment, the combination step comprises applying the EXCLUSIVE OR (or XOR) logical operator between the different infective messages and the recomposed message.

Preferentially, the combination step comprises a first initial sub-step combining (e.g. XOR) the recomposed message with one of the infective messages and one or more subsequent sub-steps combining the result of the initial sub-step with the other infective message or messages. It is possible that each subsequent sub-step combines the result of the previous sub-step with another of the infective messages/ciphers. Also, all the infective messages are gradually combined. As a variant, the other infective messages may be combined together before being combined with the result of the initial sub-step.

Starting by combining the recomposed message, the resistance of the countermeasure to certain attacks injecting more faults than the number of pairs of intermediate messages is improved.

In one embodiment, the recomposed message is one of the first messages resulting directly from one of the executions of the cryptographic operation. This simplifies the calculations.

In one variant, the recomposed message is formed of bits originating from several or all of the first messages resulting directly from the executions of the cryptographic operation, for example by equal and alternate distribution of the bits between the intermediate messages or the pairs of such messages.

In one embodiment where each intermediate message is a first message resulting directly from one of the executions of the cryptographic operation, the recomposed message may be formed of bits originating from first messages of at least two different pairs (i.e. processed by different diffusion functions).

For example, the recomposed message is formed of bits originating from first messages of each of the pairs.

In a preferred manner, at least one or more or each byte of the recomposed message is formed of bits originating from first messages of at least two different pairs. This notably applies in cases where at least eight pairs are generated.

This thus prevents an attacker from recovering, via identical faults during two executions of the same pair, a cipher infected by a fault without this being diffused or modified. The security of the system is therefore improved.

It must be understood from the foregoing that each bit of the recomposed message originates from one of the first messages and occupies the same position in the recomposed message as its position in the first message from which it originates. In fact, it is the first recomposed message which is provided as the output message in the absence of a fault.

Another aspect of the invention relates to a non-transient computer-readable medium storing a program which, when it is executed by a processor of a cryptographic processing device, causes the cryptographic processing device to perform the method as defined hereinbefore.

At least part of the methods according to the invention may be implemented by computer. Consequently, the present invention may take the form of a fully hardware embodiment, a fully software embodiment (comprising microprograms, resident software, microcodes, etc.) or an embodiment combining software and hardware aspects which can all collectively be referred to herein as a "circuit", "module" or "system". In addition, the present invention may take the form of a computer program product included in any tangible expression medium having a program code which may be used by a computer incorporated in the medium.

Given that the present invention may be implemented in software, the present invention may be incorporated in the form of computer-readable code to be provided to a programmable device on any suitable medium. A tangible or non-transient medium may comprise a storage medium such as a hard disk drive, a magnetic tape device or a solid-state memory device and the like. A transient medium may comprise a signal such as an electrical signal, an electronic signal, an optical signal, an acoustic signal, a magnetic signal or an electromagnetic signal, for example a high-frequency or RF (radiofrequency) signal.

BRIEF DESCRIPTION OF THE DRAWINGS

Other particular features and advantages of the invention will become more apparent in the following description, illustrated by the appended figures which depict examples of non-limiting embodiments.

DETAILED DESCRIPTION

The invention proposes a novel type of infective countermeasures for securing cryptographic processing devices against fault injection attacks.

Instead of determining the injected error before amplifying it, the novel countermeasure applies a single diffusion function to two intermediate messages obtained by executing a cryptographic operation on an input message. The error is therefore amplified within the intermediate messages themselves, referred to as infective messages after diffusion.

It is thus possible to overcome the constraint of the diffusion functions aimed at mapping an intermediate message 0 as an "infective" message 0. The result is a greater choice of available diffusion functions.

A message recomposed from bits of messages resulting from the executions of the cryptographic operation is also generated.

The infective and recomposed messages are XOR-combined to provide an output message. This operation by pairs of intermediate messages and associated diffusion function makes it possible, by simple duplication of this assembly with a different diffusion function each time, to scale the countermeasure to the desired protection level, i.e. to the number of injection faults which the countermeasure must resist.

The cryptographic processing may receive a cleartext message as input and thus generate an encrypted message or "cipher" as output. This is the case for example for encryption or digital signature type cryptographic operations. In this case, the intermediate, infective and recomposed messages are also encrypted.

As a variant, the cryptographic processing may receive as input an encrypted message and thus generate a decrypted or "cleartext" message as output. This is the case, for example, for decryption-type cryptographic operations. In this case, the intermediate, infective and recomposed messages are also cleartext messages.

To clarify the words hereunder, reference is principally made to first, intermediate, infective, recomposed and "cipher"-type output messages (in which case the input message is in "cleartext"), but the invention also applies to the case of "cleartext"-type messages resulting from the decryption of an encrypted input message. Generally, a person skilled in the art is capable of applying the following teachings to any type of message (cleartext or encrypted) instead of the "ciphers" specifically indicated.

Figure 2:
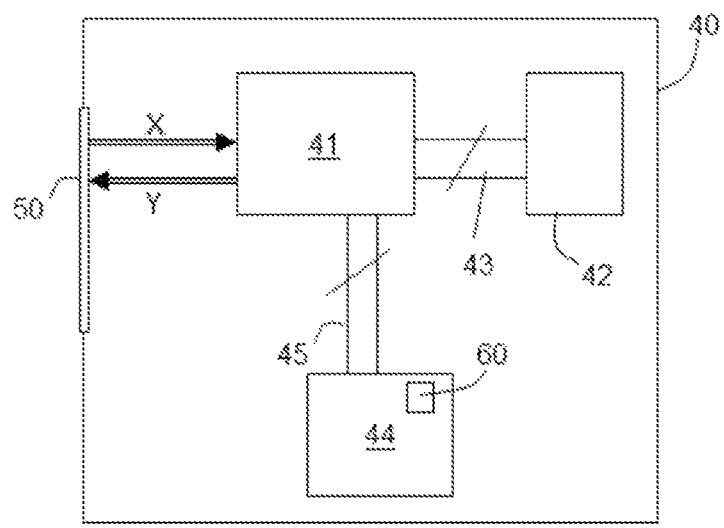
FIG. 2 schematically depicts a data-processing device forming a cryptographic system in which the present invention is implemented.

FIG. 2 schematically depicts a data-processing device 40 forming a cryptographic system in which the present invention is implemented. This device 40 comprises a microprocessor 41, with which is associated on the one hand a random access memory 42, for example by means of a bus 43, and on the other hand a non-volatile memory 44 (for example of the EEPROM type), for example through a bus 45. The buses 43 and 45 may be one and the same bus. The microprocessor 41 may be a secure cryptoprocessor.

The data-processing device 40, and specifically the microprocessor 41 which it incorporates, may exchange data with external devices by means of a communication interface 50.

FIG. 2 schematically depicts the transmission of input data X received from an external device (not shown) and transmitted from the communication interface 50 to the microprocessor 41. In a similar manner, the transmission of output data Y from the microprocessor 41 to the communication interface 50 bound for the external device is depicted. This output data Y originates from a processing of data by the microprocessor 41, generally on the input data X using secret data 60 internal to the system, for example a private key stored in memory.

The input data X and output data Y may be the input E and output data S of a cryptographic processing algorithm according to the invention, typically a cleartext message (or alternatively a cipher) at the input and an encrypted message (or alternatively a cleartext message) at the output. As a variant, other processing operations may be foreseen on the input data X and/or on the cipher S in the device 40 such that data X, Y and E, S may be, in whole or in part, different.

Although, in the illustration, the input data and the output data appear on two different arrows, the physical means which facilitate the communication between the microprocessor 41 and the interface 50 may be provided by unique means, for example a serial communication port or a bus.

The microprocessor 41 is able to execute a software (or computer program) which enables the data-processing device 40 to execute a method compliant with the invention, examples of which are given below with respect to FIGS. 4 to 9. The software consists of a series of command instructions of the microprocessor 41 which are, for example, stored in the memory 44.

As a variant, the microprocessor 41/non-volatile memory 44/random-access memory 42 assembly may be replaced by an application-specific circuit which then comprises means for implementing the various steps of the method according to the invention.

Data-processing devices 40 include secure elements which may be embedded (embedded SE or eSE) or not, for example smart cards, UICC cards (or eUICC—for embedded Universal Integrated Circuit Card) or SIM cards (or eSIM).

Figure 1:
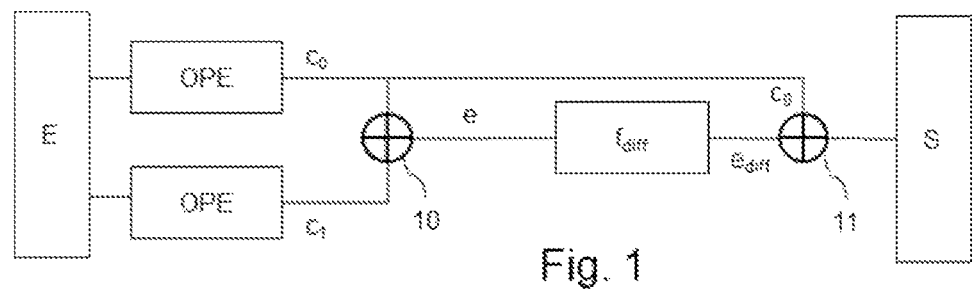
FIG. 1 schematically shows the principle of known infective countermeasures.
Figure 3:
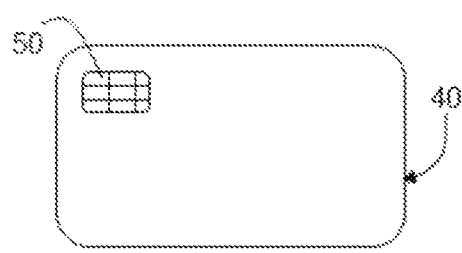
FIG. 3 depicts a smart card which constitutes an example of a cryptographic processing device for an implementation of the invention as depicted in FIG. 1.

FIG. 3 depicts a smart card which constitutes an example of a cryptographic processing device for an implementation of the invention as depicted in FIG. 2. In this case, the communication interface 50 is produced for example by means of the contacts of the smart card. The smart card incorporates a microprocessor 41, a random access memory 42 and a non-volatile memory 44 as is depicted in FIG. 1.

This smart card is, for example, compliant with standard ISO 7816 and equipped with a secure microcontroller which groups together the microprocessor (or CPU) 41 and the random access memory 42.

As a variant, the cryptographic processing device may be included in a USB stick, a document or a paper information medium comprising, in one of its sheets, a microcircuit associated with contactless communication means. In a preferred manner, it is a portable or pocket electronic entity. Naturally, the invention also applies to a cryptographic processing device equipping a personal computer or a server.

Such a cryptographic processing device may, for example, receive a binary message E to be processed (encryption or signature for example) and return a cipher S.

In the following examples, reference is principally made to a cryptographic operation OPE of AES (Advanced Encryption Standard) type to encrypt the message E. The size of the latter is, for example, L=128 bits (i.e. 16 bytes).

Naturally, the invention applies to any type of cryptographic operation, whether it be encryption and/or signature. Similarly, the invention applies to any size L (in bits) of input message E, preferentially an integer (1 or more) of bytes.

Figure 4:
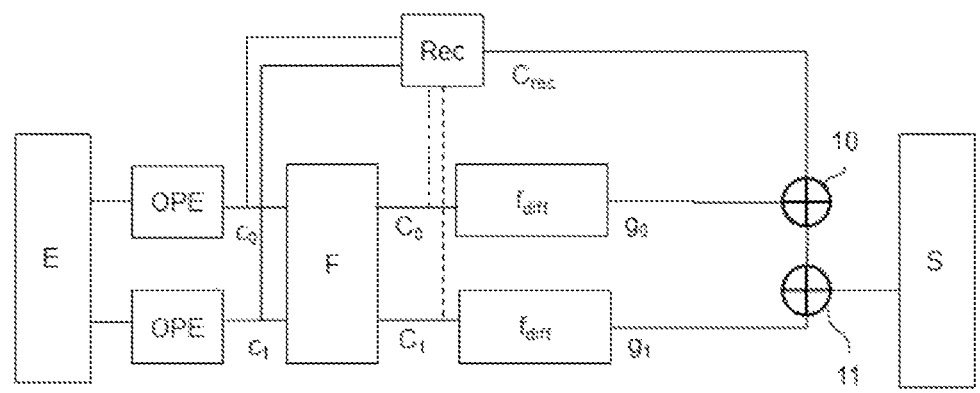
FIG. 4 schematically illustrates the general principle of the improved infective countermeasure according to the invention.

FIG. 4 schematically illustrates the general principle of the improved countermeasure according to the invention.

In contrast to the approach of the prior art, it is no longer sought to obtain the injected error 'e' in order to modify it by the diffusion function. According to the invention, the injected error is nonetheless diffused but within intermediate ciphers $C_0$ and $C_1$ themselves originating (via the function F) from the first ciphers $c_0$ and $c_1$ directly obtained from the executions of the cryptographic operation on the input message E.

The final recombination of different ciphers, for example via the XORs 10, 11, makes it possible to reinject the diffused error in one of the ciphers.

The execution of the same cryptographic operation OPE can be found several times on the input data E to obtain herein a pair of intermediate ciphers $C_0$, $C_1$, but more generally, as disclosed hereinafter, one or more pairs of intermediate messages.

In a simple manner and according to the embodiments, the intermediate ciphers may be simply the first ciphers resulting directly from the executions of the cryptographic operation, i.e. $C_0=c_0$ and $C_1=c_1$, or may combine, mix or concatenate ("||" being the concatenation operator) the first ciphers resulting from these executions, for example $C_0=c_0\|c_1$ and $C_1=c_1\|c_0$.

Diffusion processing is then performed for each pair of intermediate ciphers.

The same diffusion function is applied to the two intermediate ciphers of the pair. This makes it possible to obtain two infective ciphers $g_0$, $g_1$. In particular, it is possible to use any type of diffusion function, and notably those which do not map the intermediate cipher 0 as the infective cipher 0. As disclosed below, the diffusion functions differ from one pair of intermediate ciphers to another, in cases where several pairs of intermediate ciphers could be generated.

Then the infective ciphers $g_0$, $g_1$ are combined with a recomposed cipher $C_{rec}$ (Rec function) originating from a selection of bits of one or more first ciphers resulting from the executions of the cryptographic operation (herein $c_0$ and $c_1$), optionally recovered via the intermediate ciphers concatenating them. The output cipher S is thus obtained.

As indicated in the Figure, the infective and recomposed ciphers are typically combined using EXCLUSIVE OR (or XOR) logical operators, which simplifies the operations. As a variant, it is possible to combine these different ciphers using a operator and its opposite '-': $C_{rec}+g_0-g_1$.

It is also indicated in the Figure that this combination initially combines the recomposed cipher with one of the infective ciphers (herein $g_0$ by means of XOR 10) and then subsequently combines the result with the other infective cipher(s) (herein $g_1$ by means of the XOR 11).

If the countermeasure in the Figure provides protection against fault injection attacks, this order in the combination of ciphers additionally protects against a second fault attacking one of the XORs.

The diffusion function $f_{diff}$ preferably returns an infective cipher of length L (in number of bits) in order to be able to perform the combination operations (XOR) on ciphers of the same length. If a diffusion function returns an infective cipher with a greater length than L, the XOR (combination) with a cipher is performed on the common length (the bits present in the two combined ciphers).

In one embodiment, the diffusion function $f_{diff}$ is a pseudorandom number generator (PRNG) based on one or more keys or "parameters", for example three rounds of AES (the PRNG is thus AES-based). Naturally, other types of diffusion function may be used, typically including the hash functions.

Pseudorandom generators are suited to cryptographic processing operations in that they are capable of producing an infective cipher likely to be barely discernible from a completely random value. Such PRNG generators include Yarrow, Fortuna, Blum Blum Shub, ISAAC generators or even multiple rounds of AES.

A first so-called "pair" key or parameter is specific to said pair, for example a unique identifier of said pair. This makes it possible to obtain different diffusion functions for the pairs using the same diffusion algorithm. This key pair is optional for the case of an implementation having a single pair of intermediate ciphers.

A second so-called "execution" key or parameter is modified from one execution of the countermeasure to another, i.e. it varies in order to obtain each new output message from a new input message, i.e. at each new execution of the countermeasure. This gives the invention a robustness over several executions of the countermeasure, using the same diffusion algorithm. By way of example, it may be a random value generated by the cryptographic system. Preferably, the same execution key is used for all the diffusion functions during the same execution of the countermeasure. This makes it possible to limit the generation of random values to a single random value by executing the countermeasure.

Naturally, the two keys can be manipulated together in the form of a single key (the result, for example, of the concatenation of two keys).

As mentioned hereinbefore, the invention proposes embodiments where each intermediate cipher (more generally message) is a first cipher resulting directly from one of the executions of the cryptographic operation. The function F in FIG. 4 is, in this case, the identity: $C_1=c_1$. These embodiments are illustrated by FIGS. 5 to 8.

Figure 5:
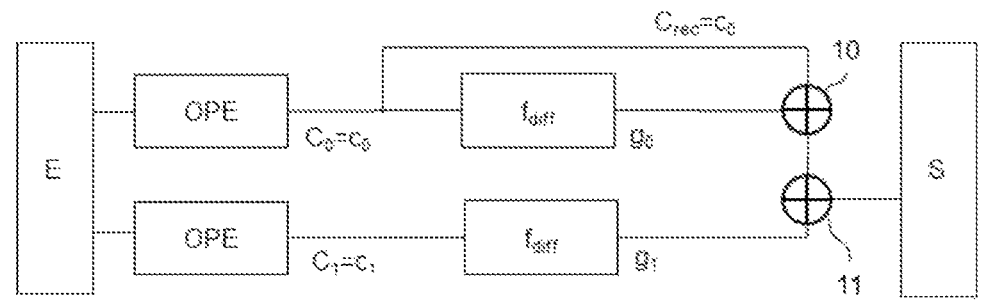
FIG. 5 schematically illustrates first embodiments of the improved countermeasure according to the invention.

The countermeasure illustrated by FIG. 5 is resistant to a fault injection, optionally over several executions of the countermeasure insofar as the execution key is changed each time the countermeasure is executed.

The cryptographic operation OPE, for example the AES, is executed twice on the input data E of length L, resulting in obtaining two first ciphers $c_0$, $c_1$ forming a single pair $(C_0=c_0, C_1=c_1)$ of intermediate ciphers of length L. Due to the identity function F, the terms "first cipher" and "intermediate cipher" are synonymous.

A single diffusion function $f_{diff}$, for example a PRNG such as three rounds of AES, is applied to the two intermediate ciphers $C_0=c_0$, $C_1=c_1$ resulting in obtaining two infective ciphers $g_0$, $g_1$ preferably of length L. The diffusion function $f_{diff}$ amplifies the potential error that one of the intermediate ciphers may contain.

The recomposed cipher is formed of one of the first two ciphers, herein $Rec(c_0, c_1)=c_0$. Also, the recomposition function Rec is, in this case, the identity function of one of the inputs thereof. The processor occupancy time is thus reduced for the infective countermeasure against a single injected fault.

The infective ciphers $g_0$, $g_1$ and the recomposed cipher $C_{rec}=c_0$ are then combined to obtain the output cipher S of length L. As illustrated, this combination may be performed using the XORs 10, 11: $S=g_0 \oplus c_0 \oplus g_1$. Preferably, the following steps are performed:

$$S \leftarrow g_0 \oplus c_0$$

$$S \leftarrow S \oplus g_1$$

In this configuration, the recomposed cipher $c_0$ is first combined with one of the infective ciphers $g_0$ and $g_1$ rather than combining the infective ciphers together before introducing $c_0$. This additionally provides protection against the injection of an additional error attacking one of the XORs.

Figure 6:
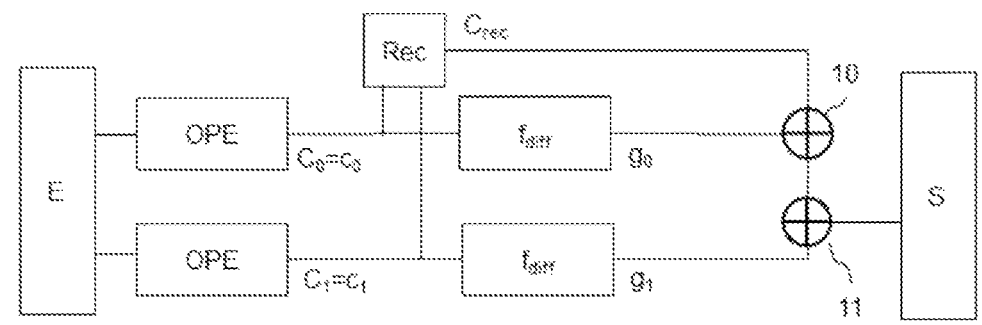
FIG. 6 illustrates a variant of the countermeasure in FIG. 5 resistant to the injection of one fault.

FIG. 6 illustrates an improved infective countermeasure variant resistant to the injection of a fault. Again, this countermeasure is resistant to attacks (injection of a single fault) on several executions thereof, insofar as the execution key is provided and changed each time the countermeasure is executed.

As for the previous Figure, the cryptographic operation OPE, for example the AES, is executed twice on the input data E of length L, resulting in obtaining the pair of intermediate ciphers $(C_0=c_0, C_1=c_1)$ of length L. Due to the identity function F, the terms "first cipher" and "intermediate cipher" are synonymous.

The same diffusion function $f_{diff}$ is applied thereto resulting in obtaining two infective ciphers $g_0$, $g_1$.

The two ciphers $C_0=c_0$, $C_1=c_1$ are also processed using the recomposition function Rec to form the recomposed cipher $C_{rec}$ of length L by selecting bits from the first ciphers $c_0$, $c_1$. If the first ciphers directly obtained from the executions of the operation OPE are combined herein, the result is identical with the intermediate ciphers $C_0$, $C_1$ since the function F is the identity.

Each bit of the recomposed cipher $C_{rec}$ originates from one of the first ciphers $c_0$, $c_1$ and occupies the same position in the recomposed cipher as its position in the first cipher from which it originates. In other words, $C_{rec}(i)=c_0(i)$ or $c_1(i)$, with x(i) representing the bit $b_i$ of index i in the cipher x. Generally the cipher x of length L is formed of bits $\{b_{L-1}, b_{L-2}, \ldots, b_2, b_1, b_0\}$.

In this variant of FIG. 6, the recomposed cipher $C_{rec}$ is formed of bits originating from the first two ciphers of the pair, i.e. there is at least one i and one j such that $C_{rec}(i)$ originates from $c_0$ and $C_{rec}(j)$ originates from $c_1$.

The recomposition function preferably (but not necessarily) uses equitably the same number of bits of each $c_i$.

Several selection schemes may be envisaged. For example, half of the bits of $C_{rec}$ originate from each first cipher $c_0$, $c_1$. However, another distribution of bits may be envisaged, for example providing at least one bit of each cipher $c_0$, $c_1$ inside one or more or all of the bytes forming the recomposed cipher $C_{rec}$.

By way of example, one in two bits may originate from one or other of the ciphers $c_0$, $c_1$. For example, $C_{rec}(2i)=c_0(2i)$ and $C_{rec}(2i+1)=c_1(2i+1)$ irrespective of $L/2>i\geq 0$ (L length of ciphers), also written as follows in Boolean notation:

$$(c_0 \wedge 0xAAA \ldots AA) \oplus (c_1 \wedge 0x555 \ldots 55)$$

with $\wedge$ the AND operator and $\oplus$ the EXCLUSIVE OR operator (XOR). Other distributions of bits may be envisaged, even being split in half. For example, $(c_0 \wedge 0x0F0F \ldots 0F) \oplus (c_1 \wedge 0xF0F0 \ldots F0)$ and more generally $(c_0 \wedge a_0) \oplus (c_1 \wedge a_1)$, where $a_0 \oplus a_1 = 0xFFFF \ldots FF$.

In the absence of an injected fault, $C_{rec}=c_0=c_1$ is found. In the presence of an injected fault, $C_{rec}$ is likely to be different from $c_0$ and/or $c_1$.

The infective ciphers $g_0$, $g_1$ and the recomposed cipher $C_{rec}$ are then combined to obtain the output cipher S. As illustrated, this combination may be produced using the XORs 10, 11: $S=g_0 \oplus Rec(c_0, c_1) \oplus g_1$. Preferably, the following steps are performed:

$$S \leftarrow Rec(c_0, c_1)$$

$$S \leftarrow g_0 \oplus S$$

$$S \leftarrow S \oplus g_1$$

In this configuration, the recomposed cipher $C_{rec}$ is first combined with one of the infective ciphers $g_0$ and $g_1$ rather than combining the infective ciphers together before introducing $C_{rec}$.

Figure 7:
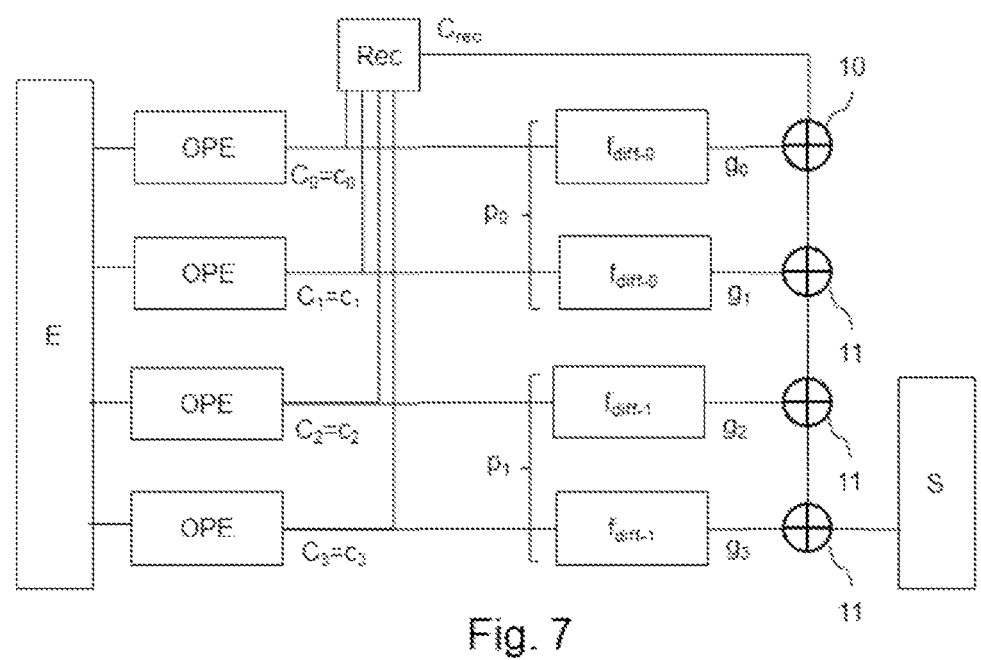
FIG. 7 illustrates an improved infective countermeasure variant resistant to the injection of two faults.

FIG. 7 illustrates an improved infective countermeasure variant resistant to the injection of two faults on an execution of the countermeasure. This countermeasure is resistant to fault injection attacks on several executions thereof where the execution key is provided and changed each time the countermeasure is executed.

The cryptographic operation OPE, for example the AES, is executed four times on the input data E, resulting in obtaining four first ciphers $c_0$ to $c_3$, four intermediate ciphers $C_0=c_0$ to $C_3=c_3$ forming two pairs of intermediate ciphers $(c_0, c_1)$ and $(c_2, c_3)$, i.e. generically $(c_{2i}, c_{2i+1})$ for the pair "$p_i$". Naturally, this organization of pairs by consecutive indices is only illustrative, for the purposes of simplifying the explanations. Due to the identity function F, the terms "first cipher" and "intermediate cipher" are synonymous.

For each pair "$p_i$", a single diffusion function $f_{diff-i}$ is applied to the two ciphers $(c_{2i}, c_{2i+1})$ of the pair. Four infective ciphers $g_0$ to $g_3$ are thus obtained.

$f_{diff-0}$ is the diffusion function for the first pair $p_0$ and $f_{diff-1}$ is that of the second pair $p_1$. As noted above, these diffusion functions may for example be PRNGs, notably AES-based PRNGs, such as three rounds of AES using different keys.

In some embodiments, the diffusion functions are based on a key pair and on an execution key. By way of example, the key pair and/or the execution key may be concatenated or XORed with the cipher at the input of the diffusion function. This makes it possible to easily obtain different diffusion functions from one pair to another and from one execution of the countermeasure to another, whilst executing the same diffusion algorithm on the concatenated or XORed input.

The use of pseudorandom number generators based on a different key from one pair of ciphers to another is only one embodiment of the invention. Generally, the diffusion function is different from one pair of ciphers to another. Additionally, it also varies from one execution of the countermeasure to another.

The four ciphers $c_0$ to $c_3$ are also processed using a recomposition function Rec, the purpose of which is to form a recomposed cipher $C_{rec}$ by selecting bits from the ciphers $c_0$ to $c_3$. Each bit of the recomposed cipher $C_{rec}$ originates from one of the ciphers $c_0$ to $c_3$ and occupies the same position in the recomposed cipher as its position in the cipher from which it originates. In other words, $C_{rec}(i)=c_0(i)$ or $c_1(i)$ or $c_2(i)$ or $c_3(i)$.

For security reasons, the recomposed cipher $C_{rec}$ is preferentially formed of bits originating from ciphers from at least two different pairs, and not only from two different ciphers.

In the case of the Figure which only presents two pairs of ciphers, the recomposed cipher $C_{rec}$ is formed of bits originating from ciphers of each of the pairs.

The recomposition function may be selected based on the attacks to be countered. By way of example, DFA (Differential Fault Analysis) type attacks on an AES-128 cryptographic operation are based on modifying four bytes of the cipher and exploiting these modifications.

In a general manner, the attacks generally exploit modifications to one, several or even all the bytes of the cipher.

In this context, the recomposition function may be selected such that at least one or more or each byte of the recomposed cipher $C_{rec}$ is formed of bits originating from ciphers of at least two different pairs, or even more than two pairs or all of the pairs when this is possible (e.g. 8 pairs maximum). This makes it possible to secure the countermeasure against certain attacks injecting the same fault into the executions of the operation OPE corresponding to a single pair of ciphers.

As noted above, several selection/recomposition schemes may be envisaged.

The recomposition function preferably (but not necessarily) uses equitably the same number of bits of each $c_i$ or of each pair $p_i$. For example, a quarter of the bits of $C_{rec}$ may originate from each cipher $c_0$ to $c_3$. As a variant, half of the bits of $C_{rec}$ may originate from the ciphers of each pair $p_i$. However, another distribution of bits may be envisaged, for example providing at least one bit of each cipher $c_0$ to $c_3$ inside one or more or each byte forming the recomposed cipher $C_{rec}$.

By way of example, one in four bits may originate from each of the ciphers $c_0$ to $c_3$. For example, $$(c_0 \wedge 0x888 \ldots 88) \oplus (c_1 \wedge 0x222 \ldots 22) \oplus (c_2 \wedge 0x444 \ldots 44) \oplus (c_3 \wedge 0x111 \ldots 11).$$

This example illustrates the case of a recomposition function which does not use two consecutive bits originating from two ciphers of the same pair.

Other distributions of bits may be envisaged, even being split into four. For example, $$(c_0 \wedge 0xF000F000 \ldots F000) \oplus (c_1 \wedge 0x0F000F00 \ldots 0F00) \oplus (c_2 \wedge 0x00F000F0 \ldots 00F0) \oplus (c_3 \wedge 0x000F000F \ldots 000F)$$

but also $$(c_0 \wedge 0xFF000000 \quad \ldots \quad FF000000) \oplus (c_1 \wedge 0x00FF0000 \quad \ldots \quad 00FF0000) \oplus (c_2 \wedge 0x0000FF00 \quad \ldots \quad 0000FF00) \oplus (c_3 \wedge 0x000000FF \ldots 000000FF),$$

and more generally $$(c_0 \wedge a_0) \oplus (c_1 \wedge a_1) \oplus (c_2 \wedge a_2) \oplus (c_3 \wedge a_3)$$

with $\oplus_{i=0}^{3} a_i = 0xFFFF \ldots FF$.

In one embodiment improving the robustness, $a_i \wedge a_{j \neq i} = 0$ (for any values of i and j) ensuring that a bit is only recovered from a single cipher.

In another embodiment, optionally capable of being combined, $a_0 \vee a_1 \neq 0$ and $a_2 \vee a_3 \neq 0$ (V being the Boolean operator OR), ensuring that at least one bit is taken from each pair.

In the absence of an injected fault, $C_{rec} = c_0 = c_1 = c_2 = c_3$ is found. In the presence of an injected fault, $C_{rec}$ is likely to be different from $c_0$ to $c_3$.

The infective ciphers $g_0$ to $g_3$ and the recomposed cipher $C_{rec}$ are then combined to obtain the output cipher S. As illustrated, this combination may be produced using the XORs 10, 11: $S = g_0 \oplus \text{Rec}(c_0, c_1, c_2, c_3) \oplus g_1 \oplus g_2 \oplus g_3$.

Naturally, the infective ciphers may be used in a different order. Additionally, if it is preferable to alternate the infective ciphers originating from different pairs, it is equally possible to produce the first XORs with the two ciphers of a single pair, then the last XORs with the two ciphers of the other pair.

Preferably, the following steps are performed:

$$S \leftarrow \text{Rec}(c_0, c_1, c_2, c_3)$$

$$S \leftarrow g_0 \oplus S$$

$$S \leftarrow S \oplus g_1$$

$$S \leftarrow S \oplus g_2$$

$$S \leftarrow S \oplus g_3$$

In this configuration, the recomposed cipher $C_{rec}$ is first combined with one of the infective ciphers $g_0$ to $g_3$ rather than combining two or more infective ciphers together before introducing $C_{rec}$. The recomposed cipher $C_{rec}$ is combined with one of the infective ciphers during an initial sub-step, then, during several successive subsequent sub-steps, each of the other infective ciphers is combined with the result of the previous sub-step.

This embodiment in FIG. 7 shows that the improved countermeasure according to the invention can be scaled to the desired security level (in terms of the number of injected faults against which the countermeasure is effective). This scaling is performed by duplicating executions of the operation OPE to add a new pair $p_i$ of intermediate ciphers and by using a novel dedicated diffusion function $f_{diff-i}$.

Also, it is possible to obtain an improved infective countermeasure which is resistant to any number of injected faults.

Figure 8:
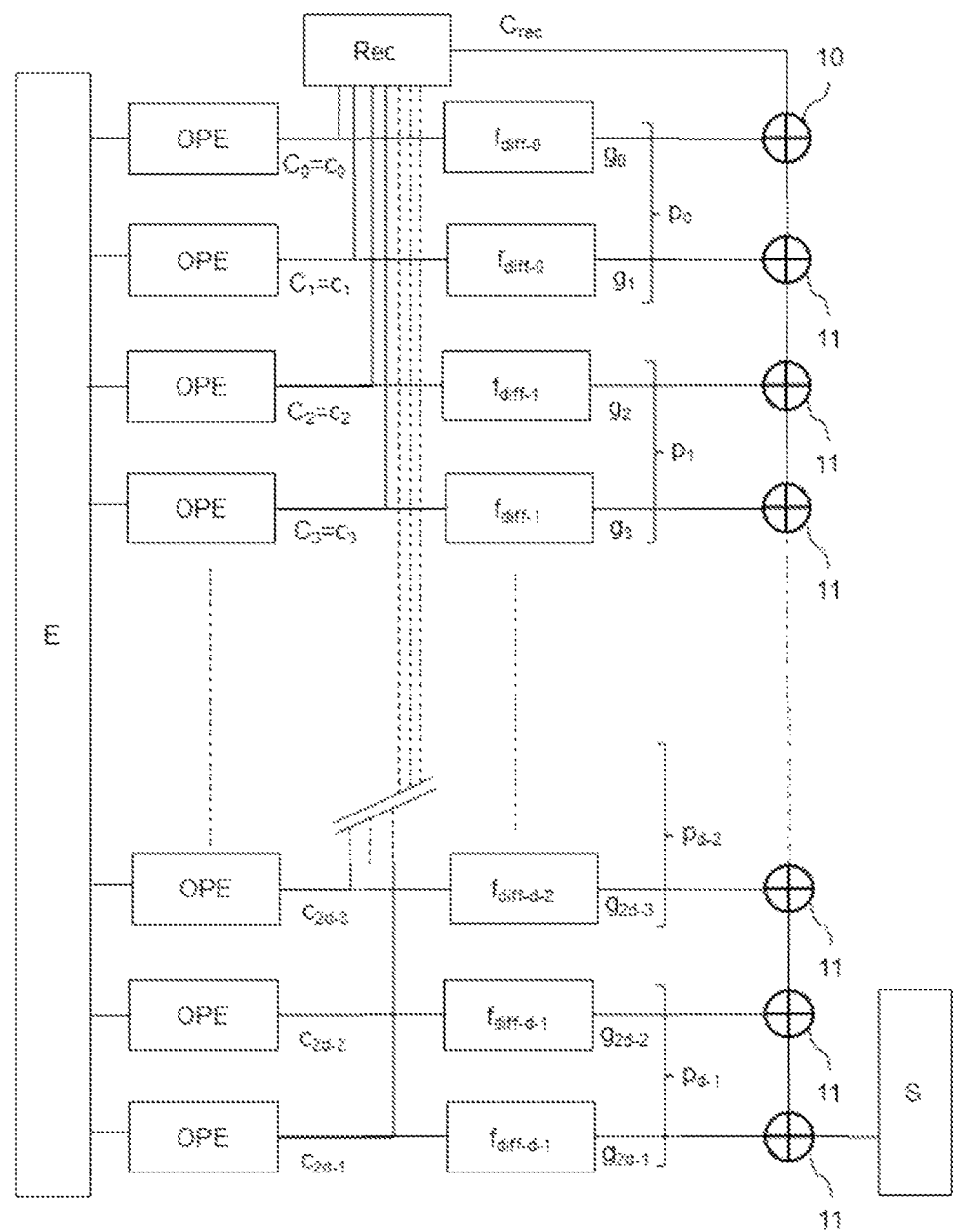
FIG. 8 illustrates an improved infective countermeasure resistant to the injection of d faults (d integer greater than or equal to 1).

As such, FIG. 8 illustrates the improved infective countermeasure resistant to the injection of d faults (d integer greater than or equal to 1) on a single execution of the countermeasure. It is therefore particularly well suited to mechanisms such as the generation of session keys.

Additionally, this countermeasure is resistant to fault injection attacks on several executions thereof where the execution key is provided and changed each time the countermeasure is executed.

The maximum value of d may depend on the OPE algorithm to be protected and/or on the type of attack being targeted. For example, since AES is sensitive to an attack which targets 32 bits of the incorrect cipher, the maximum value for d is 31. In other words, this maximum value is the minimum number of bits of the cipher on which the attack can be based, minus 1.

The cryptographic operation OPE, for example AES, is executed 2d times on the input data E, resulting in obtaining $2d$ intermediate ciphers $C_0$ to $C_{2d-1}$ equal to the 2d first ciphers $c_0$ to $c_{2d-1}$ directly originating from the executions of the operation OPE. They form d pairs of ciphers $(c_0, c_1)$, $(c_2, c_3)$ ... $(c_{2d-2}, c_{2d-1})$, i.e. generically $(c_{2i}, c_{2i+1})$ for the pair $p_i$. Naturally, this organization of pairs by consecutive indices is only illustrative, for the purposes of simplifying the explanations. Again, due to the identity function F, the terms "first cipher" and "intermediate cipher" are synonymous.

The multiple executions of the operation OPE may be in whole or in part simultaneous and/or in sequence.

For each pair $p_i$ ($0 \leq i < d$), a single diffusion function $f_{diff-i}$, for example a PRNG such as three rounds of AES using a key pair $K_i$ ($K_i \neq K_j$ for any i, j with $i \neq j$) and optionally an execution key (a random value), is applied to the two ciphers $(c_{2i}, c_{2i+1})$ of the pair. Two infective ciphers $g_{2i}$ to $g_{2i+1}$ per pair are thus obtained, i.e. a total of 2d infective ciphers $g_0$ to $g_{2d-1}$.

The explanations provided above on the diffusion functions also apply to this embodiment. For example, the use of pseudorandom number generators based on a different key $K_i$ from one pair of ciphers to another is only one embodiment of the invention. Generally, the diffusion function is different from one pair of ciphers to another. One or more diffusion functions used may be PRNGs while one or more others may be one or more other types, for example hash functions. Also, the key pair and/or the execution key may be concatenated or XORed with the intermediate cipher at the input of the diffusion function.

The 2d ciphers $c_0$ to $c_{2d-1}$ are also processed using a recomposition function Rec, the purpose of which is to form a recomposed cipher $C_{rec}$ by selecting bits from the ciphers $c_0$ to $c_{2d-1}$. Each bit of the recomposed cipher $C_{rec}$ originates from one of the ciphers $c_0$ to $c_{2d-1}$ and occupies the same position in the recomposed cipher as its position in the cipher from which it originates. In other words, $C_{rec}(i) = c_j(i)$ where j=0 to 2d−1.

For security reasons, the recomposed cipher $C_{rec}$ is preferentially formed of bits originating from ciphers from at least two different pairs, and not only from two different ciphers.

In one particular embodiment, the recomposed cipher $C_{rec}$ is formed of bits originating from ciphers of each of the pairs. This makes it possible to statistically mix, in the recomposed cipher, some of the errors injected into the different executions of the operation OPE.

The recomposition function may be selected based on the attacks to be countered. By way of example, DFA (Differential Fault Analysis) type attacks on an AES-128 cryptographic operation are based on modifying four bytes of the cipher (due to the size of the MixColumns operation in the AES) and exploiting these modifications.

In a general manner, the attacks generally exploit modifications to one, several or even all the bytes of the cipher.

In this context, the recomposition function may be selected such that at least one or more or each byte of the recomposed cipher $C_{rec}$ is formed of bits originating from ciphers of at least two different pairs, or even more than two pairs or all of the pairs when this is possible (e.g. 8 pairs maximum per byte). This actually makes it possible to secure the countermeasure against certain attacks injecting the same fault into the executions of the operation OPE corresponding to one pair of ciphers.

As noted above, several selection/recomposition schemes may be envisaged.

The recomposition function preferably (but not necessarily) uses equitably the same number of bits of each $c_i$ or of each pair $p_i$. For example, ½d of the bits of $C_{rec}$ may originate from each cipher $c_0$ to $c_{2d-1}$. As a variant, 1/d of the bits of $C_{rec}$ may originate from the ciphers of each pair $p_i$. However, another distribution of bits may be envisaged, for example providing at least one bit of each cipher $c_0$ to $c_{2d-1}$ inside one or more or each byte forming the recomposed cipher $C_{rec}$.

By way of example, one bit every 2d bits may originate from each of the ciphers $c_0$ to $c_{2d-1}$. If d is not a power of 2, an extra bit may be selected for certain ciphers with respect to others.

Typically if d is a power of 2, the following recomposition function may be used:

$$\bigoplus_{i=0}^{2d-1} c_i \wedge \left( \sum_{j=0}^{(\frac{128}{2d}-1)} 2^{\frac{128}{2d}*j} \ll (i) \right)$$

where x<<y shifts (rotation) the bits of x by y positions (bits) to the left.

A person skilled in the art is able to identify recomposition functions ensuring the selection of bits originating from ciphers of at least two distinct pairs, optionally inside the same byte, of each of several bytes, or even of each byte of the recomposed cipher.

For example, $\text{Rec}(c_0, c_1, \ldots, c_{2d-1}) = \bigoplus_{i=1}^{2d-1} c_i \wedge a_i$ with $\bigoplus_{i=0}^{2d-1} a_i = 0xFFFF \ldots FF$.

In one embodiment improving the robustness, $a_i \wedge_{j \neq i} = 0$ (for all i and j).

Additionally, to ensure that at least one bit is selected from n (e.g. n=2) distinct pairs of ciphers, $a_i \vee a_{d+i} \neq 0$ for at least n different values of i. This condition is applied to all the bits of $a_i$, but, as a variant, it may be applied to a particular byte, to several bytes, to each of several bytes or to each byte of $a_i$ depending on the desired constraints.

In the absence of an injected fault, $C_{rec} = c_{i, i=0 \ldots 2d-1}$ is found. In the presence of an injected fault, $C_{rec}$ is likely to be different from $c_0$ to $c_{2d-1}$.

The infective ciphers $g_0$ to $g_{2d-1}$ and the recomposed cipher $C_{rec}$ are then combined to obtain the output cipher S. As illustrated, this combination may be produced using the XORs 10, 11: $S = g_0 \oplus \text{Rec}(c_0, c_1, \ldots, c_{2d-1}) \oplus g_1 \oplus g_2 \ldots \oplus g_{2d-1}$.

Naturally, the infective ciphers may be used in a different order. Additionally, if it is preferable to alternate the infective ciphers originating from different pairs, it is equally possible to perform two consecutive XORs with the two ciphers of a single pair.

Preferably, the following steps are performed by first combining the recomposed cipher $C_{rec}$ with one of the infective ciphers $g_0$ to $g_{2d-1}$ rather than combining two or more infective ciphers together before introducing $C_{rec}$, then combining the result of each successive combination with each of the other infective ciphers.

While the infective countermeasures illustrated by FIGS. 5 to 8 are resistant to the injection of d faults on one execution, they do not guarantee the same degree of security over several executions (only protection against one fault).

The embodiments presented hereinafter, in connection with FIG. 9, offer enhanced security, notably against the injection of d faults on one execution and against the repeated injection of d faults on several executions of the countermeasure. The maximum value of d (d integer greater than or equal to 1) is as mentioned above in reference to FIG. 8.

Additionally, these embodiments have the advantage of being less complex since, as explained below, the number of executions of the operation OPE and diffusion functions is substantially reduced (to d or d+1 compared with 2d).

In these embodiments, each intermediate cipher $C_i$ is a cipher combining or concatenating several or all of the first ciphers $c_i$ resulting directly from the executions of the cryptographic operation. In other words, the function F (FIG. 4) is not the identity function but it combines all or part of the first ciphers $c_i$.

The cryptographic operation OPE, for example the AES, is executed d+1 times on the input data E of length L, resulting in obtaining d+1 first ciphers $c_0$ to $c_d$ directly originating from the executions of the operation OPE. The mixing function F of the first ciphers makes it possible to generate k pairs of intermediate ciphers $(C_0, C_1)$, $(C_2, C_3) \ldots$, or generically $(C_{2i}, C_{2i+1})$ for the pair $p_i$. Naturally, this organization of pairs by consecutive indices is only illustrative, for the purposes of simplifying the explanations.

The multiple executions of the operation OPE may be in whole or in part simultaneous and/or in sequence.

k depends on d: if d is even, k=d/2; if d is uneven, k=(d+1)/2. Also, if d is even, the function F generates intermediate ciphers organized into pairs; if d is uneven, function F generates d+1 intermediate ciphers organized into pairs. If d=2, one pair of intermediate ciphers is found, in a similar way to FIG. 5 or 6 for the embodiment hereinbefore. If d=3 or 4, two pairs of intermediate ciphers are found, in a similar way to FIG. 7 for the embodiment hereinbefore.

The function F produces intermediate ciphers $C_i$ from a concatenation of all or part of the first ciphers $c_0$ to $c_d$, which differs from one intermediate cipher to another.

The function F may be selected such that the injection of the same fault on n (2 or more) executions of the operation OPE (therefore in two or more $c_i$) does not result in obtaining too many pairs of identical intermediate ciphers, which would lead to their cancellation via the final XORs 10, 11. This protection is possible by selecting appropriate concatenations and offers the advantage of enabling the same diffusion function $f_{\text{diff}}$ to be used for several if not all of the pairs of intermediate ciphers.

For example for d=3 (therefore k=2 pairs), four executions of the operation OPE take place resulting in obtaining $c_0$ to $c_3$. The four (2k) intermediate ciphers, of length (d+1) L, can be formed as follows:

$C_0 = c_0 \| c_1 \| c_2 \| c_3$, $C_1 = c_1 \| c_2 \| c_3 \| c_0$, $C_2 = c_2 \| c_0 \| c_1 \| c_3$, $C_3 = c_3 \| c_2 \| c_0 \| c_1$.

As a variant, it is possible to simply form the intermediate ciphers in distinct pairs of first ciphers (sliding pairs). Typically, it is possible to browse a circular queue composed of d+1 first ciphers:

$C_0 = c_0 \| c_1$, $C_1 = c_1 \| c_2$, $C_2 = c_2 \| c_3$, $C_3 = c_3 \| c_0$.

Each row of the tables defines a concatenation profile, where each cipher $c_i$ has a cipher position in the concatenation.

Such a concatenation table, for each pair (d, k) may be provided in the memory of the device.

These table examples illustrate a more general approach according to which at most $$\left\lfloor \frac{n}{2} \right\rfloor$$

disjoint pairs of concatenation profiles are symmetrical for a group of n first messages. A pair of concatenation profiles is said to be symmetrical for the group of n first messages when its two concatenation profiles use the same message positions in the concatenation to position the first messages originating from the group of n first messages (the profile may only contain some of the n first messages of the group, but not all of them). This condition is verified for every value of n between 2 and d. It should be noted that $\lfloor x \rfloor$ is the floor of x.

Thus, this avoids having $$\left\lfloor \frac{n}{2} \right\rfloor + 1 \text{ pairs}$$

in which the two intermediate ciphers are identical and consequently, in which the corresponding infective ciphers cancel each other out in pairs during the final combination. It is thus guaranteed that $$2\left(k - \left\lfloor \frac{n}{2} \right\rfloor\right)$$

infective ciphers do not cancel each other during this combination, ensuring robustness against 2k injected faults.

For example, for d=16, 17 first ciphers $c_i$ and 16 intermediate ciphers $C_j$ are obtained. It is therefore possible to verify that the concatenation profiles for obtaining the intermediate ciphers are not sensitive to two injected faults (n=2) by verifying that there is no more than one pair of concatenation profiles which is symmetrical for two (n) first ciphers. In the opposite case, two faults on the two corresponding executions would make it possible to obtain four (or more) identical intermediate ciphers for the two symmetrical pairs and therefore to cancel (in the case of an identical diffusion function) the corresponding infective ciphers during the XOR combination. At most 12 faults would make it possible to short circuit the other 12 XORs and an additional fault would make it possible to obtain, via $C_{rec}$, an uninfected cipher fault. Thus 15 faults would be sufficient to circumvent the countermeasure.

It is also verified that the concatenation profiles are not sensitive to three injected faults (n=3) by verifying that there is not more than one pair of concatenation profiles that is symmetrical for three (n) first ciphers. Similarly for four injected faults (n=4) by verifying that there are not more than two pairs of concatenation profiles that are symmetrical for four (n) first ciphers. And so on, up to d injected faults (n=d).

If, by chance, $$\left\lfloor \frac{n}{2} \right\rfloor + 1$$

(or more) pairs of concatenation profiles were symmetrical for a group of n first ciphers, it is possible to provide the desired robustness by adding one or more pairs of intermediate ciphers to the existing pairs, where the intermediate ciphers of one pair combine at least one of the ciphers of the group with at least one of the one of the first ciphers not in the group, according to two distinct profiles.

For example, if $c_0$ belongs to said group and $c_3$ does not, a pair formed of the intermediate ciphers $c_0 \| c_3$ and $c_3 \| c_0$ may be added.

In one variant simplifying the concatenation operations, and as shown in the Figure, the cipher mixing function F comprises a concatenation module CONCAT producing a master cipher CM (of length (d+1) L bits) concatenating all the first ciphers $c_0$ to $c_d$ resulting directly from the executions of the cryptographic operation.

2k operations $R_j$ can then be applied to the same master cipher in order to obtain the intermediate ciphers.

For example, the operation $R_j$ may be a sliding window for selecting two ciphers in CM (which operates as a circular queue). Thus, $R_0$ selects $c_0$ and $c_1$ to form $C_0$ ($C_0 = c_0 \| c_1$), $R_1$ selects $c_1$ and $c_2$ to form $C_1$ ($C_1 = c_1 \| c_2$), and so on.

As a variant, the operations $R_j$ may be rotation operations, on a multiple of L bits (length of each cipher $c_i$), of the master cipher CM.

For example, the rotation $R_j$ to obtain the intermediate cipher $C_j$ may involve shifting the bits of the master cipher CM to the left by jL bits (i.e. shift by j ciphers $c_i$). The rotation $R_0$ is thus the identity: $C_0 = CM$.

In another example, $R_{2j} = Id$ and $R_{2j+1}$ is any rotation of the bits of the master cipher CM by a multiple of L bits (therefore rotation of one or more ciphers $c_i$) which differs from the identity. Thus for each pair $p_i$ of intermediate ciphers, there is the master cipher $C_{2j} = CM$ and an intermediate cipher $C_{2j+1}$ resulting from another concatenation of ciphers $c_0$ to $c_d$.

As these different mixtures of ciphers by rotation do not guarantee the absence of identical intermediate ciphers in the case of identical faults on several executions of the operation OPE, the diffusion functions to be applied may differ from one to another.

Examples of diffusion functions, notably based on a key pair and optionally on an execution key, are given above.

For each pair $p_i$ ($0 \leq i < k$), a single diffusion function $f_{diff-i}$ is applied to two intermediate ciphers ($C_{2i}$, $C_{2i+1}$) of the pair. Two infective ciphers $g_{2i}$ to $g_{2i+1}$ per pair are thus obtained, i.e. a total of 2k (d if d is even, d+1 if d is uneven) infective ciphers $g_0$ to $g_{2k-1}$. The infective ciphers therefore cancel each other out two by two.

The explanations provided above on the diffusion functions also apply to this embodiment. For example, the use of pseudorandom number generators based on a different key $K_i$ from one pair of ciphers to another is only one embodiment of the invention. Generally, the diffusion function is different from one pair of ciphers to another. One or more diffusion functions used may be PRNGs while one or more others may be one or more other types, for example hash functions. Also, the key pair and/or the execution key may be concatenated or XORed with the intermediate cipher at the input of the diffusion function.

In some embodiments, it is possible to use a single diffusion function for a subset of pairs, and this for two or more subsets (the diffusion functions differ from one subset to another). In this case, it is possible to ensure that the concatenation profiles used in each subset of pairs are not sensitive to n injected faults as disclosed hereinbefore (n being limited by the number of intermediate ciphers comprising the subset in question).

It should be noted that in the embodiments where the diffusion functions receive an input of ciphers of multiple length of L (for example 2 L or (d+1) L bits in the examples hereinbefore), they preferably generate infective ciphers of length L bits. The diffusion functions used must therefore be able to absorb the multiple (2 or d+1 in the examples) input ciphers (forming the intermediate cipher). Hash functions may therefore be typically used.

Naturally, the output of the diffusion functions may be longer than L bits, in which case, the combinations (XOR 10 and 11) work on the least significant bits L.

Figure 9:
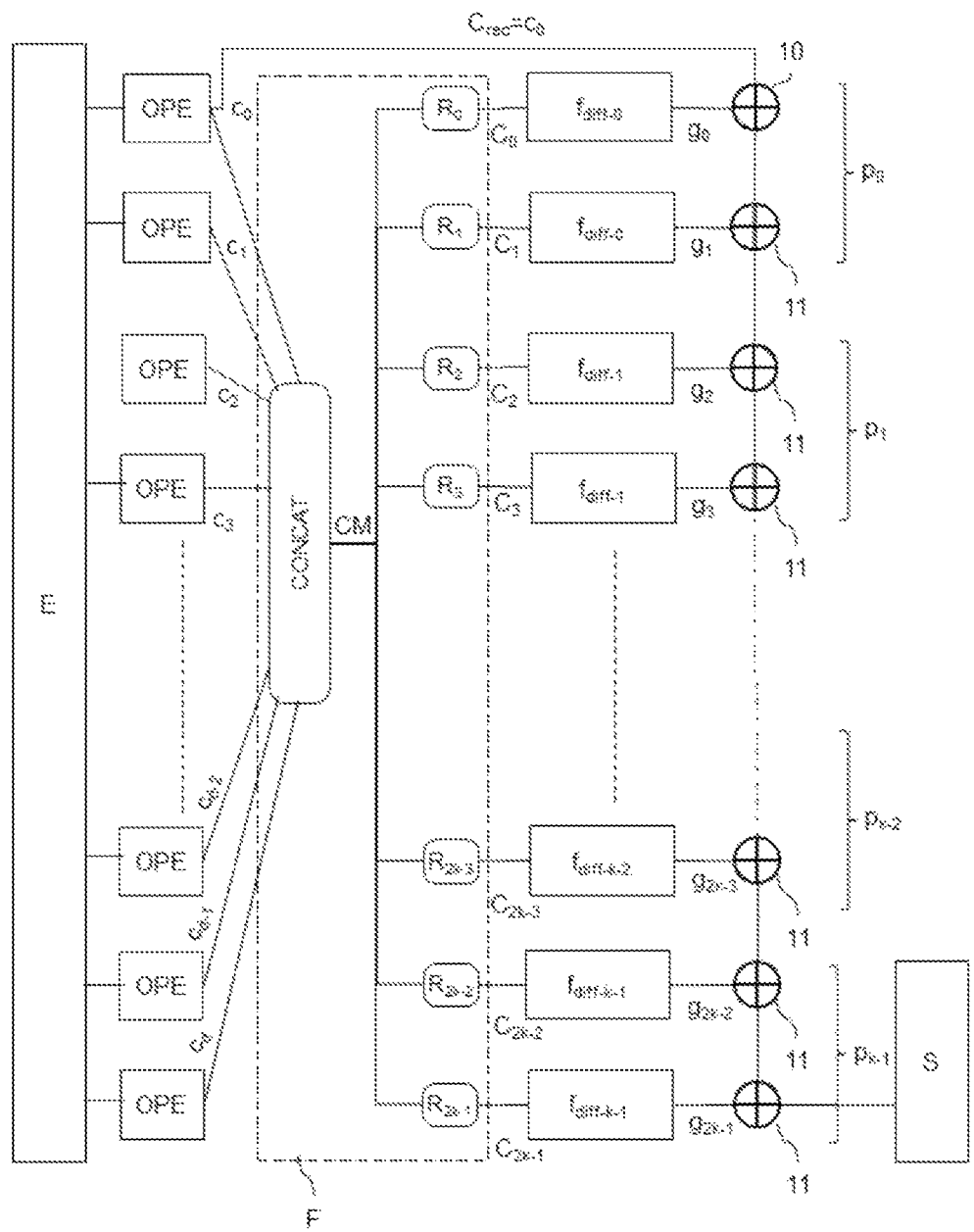
FIG. 9 schematically illustrates second embodiments of the improved countermeasure according to the invention.

In the example of FIG. 9, the first cipher $c_0$ is used as a recomposed cipher $C_{rec}$ for the purposes of the final combination by XOR 10. Any other first cipher $c_i$ may be used instead, irrespective of the number of executions of the operation OPE.

The use of a single first cipher for $C_{rec}$ simplifies the diagram in the Figure.

As a variant, the recomposed cipher $C_{rec}$ may be formed by selecting bits of all or part of the first ciphers $c_0$ to $c_d$. The explanations given above about the recomposition function Rec also applies to this embodiment.

For example, in the variant with sliding pairs mentioned hereinbefore, the recomposed cipher $C_{rec}$ is formed from bits or bytes or ciphers originating from intermediate ciphers of each pair (or more generally all intermediate ciphers) sharing the same diffusion function.

If it is detected that $$\left\lfloor \frac{n}{2} \right\rfloor$$

disjoint pairs of concatenation profiles are symmetrical, then it is possible to select the recomposed message so that it is not only formed of one or more of said n first messages of the group. It is possible for example to select a first cipher which is not involved in the symmetries between concatenation profiles. This constraint may be applied for any value of n, or only when n is even. Similarly, it may be applied for any value of d, or only when d is even. Otherwise, it is possible to use a single first cipher as $C_{rec}$.

In the absence of an injected fault, $C_{rec} = c_{i,\ i=0\ldots d}$ is found. In the presence of an injected fault, $C_{rec}$ is likely to be different from $c_0$ to $c_d$.

It is noted that if the recomposition can be performed by selecting bits in the first ciphers $c_0$ to $c_d$, it is also possible to make this selection from one (or a plurality of) intermediate cipher $C_i$ insofar as this latter concatenates, in some embodiments, all or part of the first ciphers $c_0$ to $c_d$.

The infective ciphers $g_0$ to $g_{2k-1}$ and the recomposed cipher $C_{rec}$ are then combined to obtain the output cipher S. As illustrated, this combination may be produced using the XORs 10, 11: $S = g_0 \oplus \text{Rec}(c_0, c_1, c_2, \ldots, c_d) \oplus g_1 \oplus g_2 \oplus \ldots \oplus g_{2k-1}$.

Naturally, the infective ciphers may be used in a different order. Additionally, if it is preferable to alternate the infective ciphers originating from different pairs, it is equally possible to realize two consecutive XORs with the two infective ciphers of a single pair.

Preferably, the following steps are performed by first combining the recomposed cipher $C_{rec}$ with one of the infective ciphers $g_0$ to $g_{2k-1}$ rather than combining two or more infective ciphers together before introducing $C_{rec}$, then combining the result of each successive combination with each of the other infective ciphers.

Although the present invention has been disclosed hereinbefore with reference to specific embodiments, the present invention is not limited to these specific embodiments, and modifications, which are found within the scope of the present invention, will be obvious to a person skilled in the art.

Numerous other modifications and variations will be imposed on those persons skilled in the art by referring to the illustrative embodiments hereinbefore, which are only given by way of example and which do not limit the scope of the invention, this only being determined by the appended claims. In particular, the different features of the different embodiments may be exchanged, where applicable.

In the claims, the word "comprising" does not exclude other elements or steps, and the indefinite article "a" or "an" does not exclude a plurality. The mere fact that different features are cited in different mutually dependent claims does not indicate that a combination of these features cannot be used advantageously.

The invention claimed is:

1. A method for cryptographic processing of an input message into an output message, comprising the following steps implemented by a processor:
    executing several times the same cryptographic operation on the input message (E) in order to obtain one or more pairs of intermediate messages,
    for each pair, applying a single diffusion function to the two intermediate messages of the pair in order to obtain two infective messages, and
    combining the infective messages with a recomposed message obtained by selecting bits from one or more first messages resulting from the executions of the cryptographic operation, in order to obtain the output message.

2. The method according to claim 1, wherein the diffusion function differs from one pair of intermediate messages to another.

3. The method according to claim 2, wherein the diffusion function of one pair is based on a first parameter specific to said pair, for example a unique identifier of said pair.

4. The method according to claim 1, wherein the diffusion functions of the pairs are based on a second parameter which varies in order to obtain a new output message from a new input message.

5. The method according to claim 1, wherein each intermediate message is a first message resulting directly from one of the executions of the cryptographic operation.

6. The method according to claim 1, wherein each intermediate message is a message concatenating, according to a corresponding concatenation profile, several or all of the first messages resulting directly from the executions of the cryptographic operation.

7. The method according to claim 6, wherein the intermediate messages of two different pairs differ from one another by a different rotation of the first messages within a single master message concatenating all the first messages.

8. The method according to claim 6, wherein the intermediate messages ($C_i$) are formed of distinct pairs of first messages.

9. The method according to claim 6, wherein at most $$\left\lfloor \frac{n}{2} \right\rfloor$$

disjoint pairs of concatenation profiles are symmetrical for a group of n first messages, for any n between 2 and d, with d+1 the total number of executions of the cryptographic operation and $\lfloor x \rfloor$ the floor of x, a pair of concatenation profiles being said to be symmetrical for the group of n first messages when its two concatenation profiles use the same message positions in the concatenation to position the first messages originating from the group of n first messages.

10. The method according to claim 9, wherein the recomposed message is formed not only by one or more of said first n messages ($c_i$) of the group when $$\left\lfloor \frac{n}{2} \right\rfloor$$

disjoint pairs of concatenation profiles are symmetrical, but also by at least one said first message that is not involved in the symmetry of the t,32 pairs of concatenation profiles.

11. The method according to claim 1, wherein the combination step comprises the application of the EXCLUSIVE OR logical operator between the different infective messages and the recomposed message.

12. The method according to claim 11, wherein the combination step comprises a first initial sub-step combining the recomposed message with one of the infective messages and one or more subsequent sub-steps combining the result of the initial sub-step with the other infective messages.

13. The method according to claim 1, wherein the recomposed message is one of the first messages resulting directly from one of the executions of the cryptographic operation.

14. The method according to claim 1, wherein the recomposed message is formed of bits originating from several or all of the first messages resulting directly from the executions of the cryptographic operation.

15. A cryptographic processing device comprising a processor configured to:

execute, several times, a single cryptographic operation on an input message in order to obtain one or more pairs of intermediate messages, for each pair, apply a single diffusion function to the two intermediate messages of the pair in order to obtain two infective messages, and combine the infective messages with a recomposed message obtained by selecting bits from one or more first messages resulting from the executions of the cryptographic operation, in order to obtain an output message.

16. A non-transient computer-readable medium for storing a program which, when it is executed by a cryptographic processing device, causes the cryptographic processing device to perform the method according to claim 1.

* * * * *